(12) United States Patent
Heddleston

(10) Patent No.: US 9,330,421 B2
(45) Date of Patent: May 3, 2016

(54) PROMPTING USER ACTION IN CONJUNCTION WITH TAGGED CONTENT ON A SOCIAL NETWORKING SYSTEM

(71) Applicant: Facebook, Inc., Menlo Park, CA (US)

(72) Inventor: Russell Eric Heddleston, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 61 days.

(21) Appl. No.: 13/772,818

(22) Filed: Feb. 21, 2013

(65) Prior Publication Data

US 2014/0237467 A1    Aug. 21, 2014

(51) Int. Cl.
*G06F 9/445* (2006.01)
*G06Q 30/02* (2012.01)
*G06Q 50/00* (2012.01)

(52) U.S. Cl.
CPC ........ *G06Q 50/01* (2013.01); *G06F 8/60* (2013.01); *G06F 8/63* (2013.01); *G06Q 30/02* (2013.01); *G06Q 30/0251* (2013.01)

(58) Field of Classification Search
None
See application file for complete search history.

(56) References Cited

U.S. PATENT DOCUMENTS

| | | | |
|---|---|---|---|
| 8,583,668 B2 * | 11/2013 | Higgins et al. | 707/758 |
| 8,745,617 B1 * | 6/2014 | Stekkelpak et al. | 717/178 |
| 2006/0271997 A1 * | 11/2006 | Jacoby et al. | 725/135 |
| 2009/0031301 A1 * | 1/2009 | D'Angelo et al. | 717/178 |
| 2010/0030740 A1 * | 2/2010 | Higgins et al. | 707/3 |
| 2010/0076968 A1 * | 3/2010 | Boyns et al. | 707/732 |
| 2010/0262477 A1 * | 10/2010 | Hillerbrand et al. | 705/14.16 |
| 2010/0312572 A1 * | 12/2010 | Ramer et al. | 705/1.1 |
| 2011/0083101 A1 * | 4/2011 | Sharon | G06Q 30/02 715/800 |
| 2011/0145275 A1 * | 6/2011 | Stewart | 707/769 |
| 2012/0166433 A1 | 6/2012 | Tseng | |
| 2012/0197709 A1 * | 8/2012 | Kendall | G06Q 30/0207 705/14.36 |
| 2012/0219191 A1 * | 8/2012 | Benzarti | G06Q 30/0201 382/106 |
| 2012/0239466 A1 * | 9/2012 | Hu | G06Q 30/0207 705/14.1 |
| 2012/0278395 A1 * | 11/2012 | Garcia | G06Q 10/00 709/205 |
| 2012/0284256 A1 * | 11/2012 | Mahajan | G06F 8/61 707/722 |
| 2012/0316955 A1 * | 12/2012 | Panguluri et al. | 705/14.41 |
| 2013/0073371 A1 * | 3/2013 | Bosworth | G06Q 30/02 705/14.35 |
| 2013/0073473 A1 * | 3/2013 | Heath | 705/319 |
| 2013/0159089 A1 * | 6/2013 | Gil | G06Q 50/01 705/14.38 |
| 2013/0185355 A1 * | 7/2013 | Tseng et al. | 709/204 |
| 2013/0191397 A1 * | 7/2013 | Avadhanam et al. | 707/748 |
| 2013/0212192 A1 * | 8/2013 | Yerli | 709/206 |
| 2013/0332246 A1 * | 12/2013 | Ennis et al. | 705/14.5 |

(Continued)

FOREIGN PATENT DOCUMENTS

WO    WO 2011043946 A1 *    4/2011    ............. G06F 15/16

OTHER PUBLICATIONS

Berjani, Betim, et al., "A Recommendation System for Spots in Location-Based Online Social Networks", 2011, pp. 1-6.*

(Continued)

*Primary Examiner* — Thuy Dao
*Assistant Examiner* — Christopher Franco
(74) *Attorney, Agent, or Firm* — Fenwick & West LLP

(57) ABSTRACT

A social networking system user is prompted to take an action or is provided with additional information associated with a location where the user has checked-in or has associated with content using a tag. When an input including the check-in or tagged location is received, the social networking system selects one or more actions based on the location, the user, and/or contextual information included in the input. A prompt identifying the one or more of the selected actions is generated and presented to the user.

13 Claims, 3 Drawing Sheets

(56) References Cited

U.S. PATENT DOCUMENTS

| | | | |
|---|---|---|---|
| 2014/0067844 A1* | 3/2014 | Higgins et al. | 707/758 |
| 2014/0074879 A1* | 3/2014 | Kwon et al. | 707/769 |
| 2014/0129942 A1* | 5/2014 | Rathod | 715/720 |

OTHER PUBLICATIONS

Bao, Jie, et al., "Location-based and Preference-Aware Recommendation Using Sparse Geo-Social Networking Data", 2012, pp. 1-10.*

Noulas, Anastasios, et al., "A Random Walk Around the City: New Venue Recommendation in Location-Based Social Networks" 2012, pp. 144-153.*

Jung, Jason J., "Contextualized mobile recommendation service based on interactive social network discovered from mobile users" 2009, pp. 11950-11956.*

Yanh, Dingqi, et al., "A sentiment-enhanced personalized location recommendation system", 2013, pp. 1-10.*

Levandoski, Justin J., et al., "LARS: A Location-Aware Recommender System" , 2012, pp. 450-461.*

Winters et al., "Mobile Page Management for Merchants Leveraging in a Social Networking System," U.S. Appl. No. 13/564,583, filed Aug. 1, 2012.

* cited by examiner

PROMPTING USER ACTION IN CONJUNCTION WITH TAGGED CONTENT ON A SOCIAL NETWORKING SYSTEM

BACKGROUND

This invention relates generally to social networking systems, and in particular to prompting a user for additional interaction associated with tagged content provided to a social networking system.

Social networking systems allow users to connect to and to communicate with other social networking system users. Users of a social networking system create profiles on the social networking system that are associated with their identities and include information about the users, such as interests and demographic information. The users may be individuals or entities such as corporations or charities. Because of the increasing popularity of social networking systems and the significant amount of user-specific information maintained by social networking systems, a social networking system presents an ideal forum for informing users about content maintained by the social networking system in which users have expressed an interest.

Conventionally, social networking systems allow users to check-in at locations and to post content about themselves and other users through status updates and other types of posts communicated to the social networking system. For example, a user may indicate it was at a specific location with other users by checking in at the location and identifying other users at the location. Content provided by the user may be presented to other social networking system users in a story displayed on a newsfeed presented to other social networking system users. However, conventional social networking systems do not identify additional content related to the story that may be of interest to the user viewing the story.

SUMMARY

Social networking systems conventionally allow users to check-in at locations or to associated a location with content provided to the social networking systems ("tag" a location associated with content). For example, a user checks-in to a theme park and uploads a photograph ("photo") taken at the theme park to a social networking system. The check-in causes the social networking system to generate a story describing the check-in and identifying the user to other users of the social networking system, such as users connected to the user or users associated with the uploaded photograph. However, information associated with content described by the story may not be readily accessible to users viewing the story. For example, a user checking into a theme park or tagging a theme park in a post by another user may not be aware that of an offer for half-priced admission at an affiliated theme park available through the social networking system.

To enhance user experience, the social networking system prompts users to perform additional actions associated with objects maintained by the social networking system when users check-in at a location associated with an object or associated an object with content provided to the social networking system ("trigger events"). For example, may be presented when users tag content with an application, a game, a user, or any other suitable object. The social networking system may prompt users to perform various actions. Examples of actions prompted by the social networking system include: claiming an offer, installing an application, liking a page, accessing on an advertisement, accessing a story describing an action performed by another social networking system user, providing more specific information about a post, or any other suitable action. For example, if a user checks-in at location associated with a movie theater and provides the name of the movie viewed at the movie theater, the social networking system may display a prompt with an offer from the movie theater for free popcorn or a link to download an application associated with the movie.

In addition to considering the check-ins or associations with objects, the social networking system may use user information and/or contextual information provided by the user (e.g., language used in a check-in) to select the action it prompts a user to take. For example, if a user checks-in at a location and creates a post stating it is "buying a new car," the social networking system may determine that the user is referring to a FORD® truck if the check-in location is associated with a FORD® dealership and the user has recently tagged photos of trucks. Based on this information, the social networking system may prompt the user for more detailed information, such as the model of the truck being purchased.

Prompts for a user to take actions related to a check-in or association with an object are presented to the user via a user interface. For example, a prompt is presented in a pop-up window, in the same interface used to create the post ("composer interface"), or in any suitable location. Presentation of a prompt may depend on the type of device used to access the social networking system (e.g., through a mobile device, desktop computer, tablet, etc.). In one embodiment, the prompt may be presented to additional users that did not perform a trigger event, but are associated with the trigger event. For example, if one user tags another user in a post, the tagged user may be presented with a prompt along with a newsfeed story about the post.

Multiple prompts may be displayed for each check-in or association with an object. A user may to scroll among various prompts associated with a check-in or association with an object. Prompts may be ranked in a display queue (e.g., by relevance to the user) and presented in an order based on the ranking. For example, prompts displayed for a check-in at a location associated with an equestrian facility may include advertisements for horseback riding gear and stories about other users that downloaded a horse racing game. The advertisements may be ranked higher than the stories if the social networking system determines from actions performed by the user and profile information associated with the user that the user is an avid rider and has never installed any games.

If the social networking system receives an input accessing a prompt for an action, the user may be directed to a destination associated with the prompted action that was accessed. For example, the user may be directed to a third party website to purchase a product if the user accesses a prompt presenting an advertisement for the product. Likewise, a user may be directed to a page for a hotel if the user interacts with a prompt presenting a story describing another user that recently checked-in at a location associated with the hotel.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

When a user of a social networking system checks-in at a location associated with an object or tags an object in content provided to the social networking system (e.g., in a status update), the social networking system provides the user with information about the object or location and/or prompts the user to take an action related to the object or location. Examples of prompts include providing a link to install an application related to the object, requesting that the user provide additional information about the user's experience at the location associated with the object, etc.

An action may be selected for prompting to a user based on a number of factors, such as prior actions by the user, contextual information provided by the user, such as the language used in content associated with the check-in, or any other suitable information. The selected action is provided to the user in a prompt. For example, if a user checks in at a movie theater and provides contextual information for the check-in that the user is "seeing a movie at Sundance Kabuki Cinemas," the social networking system may prompt the user for more detailed information, such as the name of the movie. Additionally, based on actions previously performed by the user, if the social networking system determines that the user has a preference for a particular director, the user may be presented with a prompt including an advertisement for an upcoming DVD release of another movie by the same director.

The social networking system may display the prompt in a variety of ways. For example, the prompt may appear in an interface in conjunction with a story to which a user is directed when checking-in at a location or creating a post including content associated with an object. The prompts may also be presented in pop-up windows, in the composer interface used to create a check-in or provide content, in a window displayed on the side of the screen, in a timeline associated with the user's profile in conjunction with a story describing the check in or content, or in any other suitable communication channel.

A prompt may direct a user to a destination associated with the prompted action when the user accesses the prompt. For example, if a prompt displays a link to install an application, the user may be directed to a destination from which the application may be installed when accessing the prompt. This allows a user to more easily perform actions prompted by the social networking system.

System Architecture

Figure 1:
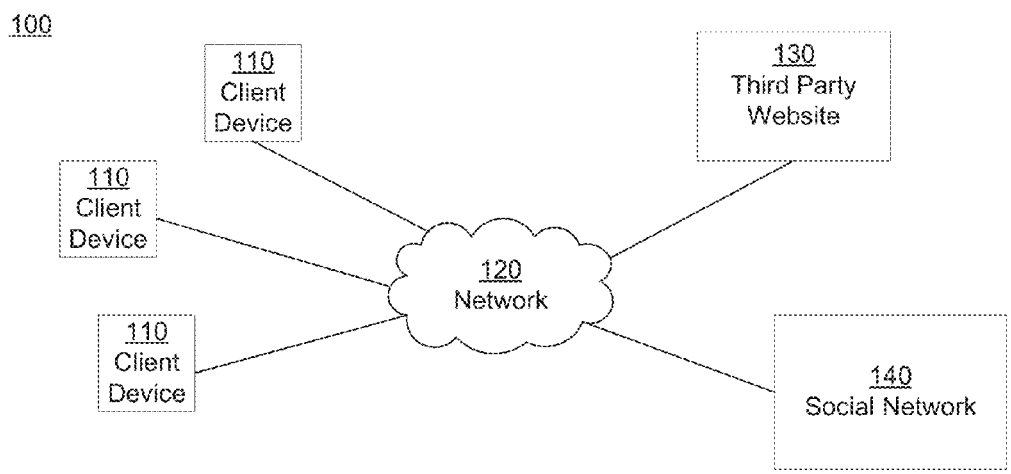
FIG. 1 is a block diagram of a system environment in which a social networking system operates, in accordance with an embodiment of the invention.

FIG. 1 is a high level block diagram of one embodiment of a system environment 100 for a social networking system 140. The system environment 100 comprises one or more client devices 110, a network 120, one or more third party websites 130, and a social networking system 140. In alternative configurations, different and/or additional components may be included in the system environment 100. The embodiments described herein may be adapted to online systems that are not social networking systems.

The client devices 110 comprise one or more computing devices capable of receiving user input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), mobile telephone, smart-phone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on a native operating system of the client device 110, such as IOS® or ANDROID™.

The client devices 110 are configured to communicate via the network 120, which may comprise any combination of local area and/or wide area networks, using both wired and wireless communication systems. In one embodiment, the network 120 uses standard communications technologies and/or protocols. Thus, the network 120 may include communication channels using technologies such as Ethernet, 802.11, worldwide interoperability for microwave access (WiMAX), 3G, 4G, code division multiple access (CDMA), digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of the communication channels may be encrypted using conventional encryption technologies such as secure sockets layer (SSL), transport layer security (TLS), and Internet Protocol security (IPsec). The third party website 130 may be coupled to the network 120 for communicating with the social networking system 140.

Figure 2:
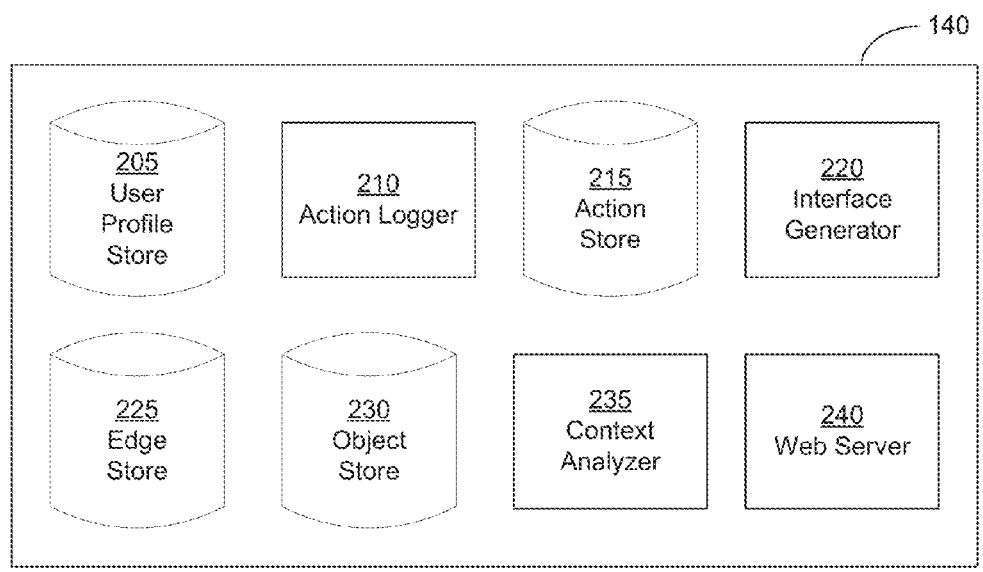
FIG. 2 is a block diagram of a social networking system, in accordance with an embodiment of the invention.

FIG. 2 is a block diagram of an example architecture of the social networking system 140. In the example of FIG. 2, the social networking system 140 includes a user profile store 205, an action logger 210, an action store 215, an interface generator 220, an edge store 225, an object store 230, a context analyzer 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user account that is typically associated with a single user profile, which is stored in the user profile store 205. A user profile includes declarative information about the user that was explicitly shared by the user, and may also include information inferred by the social networking system 140. A user profile may include multiple data fields, each describing one or more attributes of the corresponding user of the social networking system 140. Hence, user profile information stored in the user profile store 205 describes various social networking system users, including biographic, demographic, and other types of descriptive information, such as work experience, educational history, gender, hobbies or preferences, location and any other suitable information. User profile information may also include data describing one or more relationships between a user and other users. Additionally, the user profile store 205 may also store other information provided by the user, for example, images, or videos. A user profile in the user profile store 205 may also maintain references to actions performed by the corresponding user and stored in the action store 215.

While user profiles in the user profile store 205 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. While an administrator or individual associated with the entity creates the user profile for the entity, the entity is identified as the account-holder associated with the user profile. The entity may post information about itself, information about its products, including catalogs of products, or provide other information to users of the social networking system 140 accessing a brand page associated with the entity's user profile. Other users of the social networking system 140 may connect to the brand page to receive information posted to the brand page or to receive information from the entity associated with the brand page. A user profile associated with an entity may provide users with background or informational data about the entity.

The action logger 210 receives communications describing user actions internal to and external to the social networking system 140. The action logger 210 populates the action store 215 with information describing user actions. When a user performs an action using the social networking system 140, the action logger 210 adds an entry to the action store 215 describing the action. Examples of actions include: posting a comment on a page, sending a message to another user, posting a photo, changing relationship status with another user, and attending an event. In addition, a number of actions described in connection with other objects are directed at particular users, so these actions are associated with those users as well. Some actions may be taken by users while not connected to the social networking system 140 and communicated to the social networking system 140 for storage when a connection is established.

The action store 215 maintains information describing actions by social networking system users internal to the social networking system 140, as well as actions performed via third party websites 130 that communicate information to the social networking system 140. Users may interact with various objects maintained by the social networking system 140, and these interactions are stored in the action store 215. Examples of actions or interactions stored by the action store 215 include: commenting on posts, sharing links, tagging objects, and checking-in to physical locations via a mobile device or other client device 110. Additional examples of interactions with objects on the social networking system 140 included in the action store 215 include commenting on a photo album, transmitting messages to another user, joining an event, joining a group, becoming a fan of a brand page, creating an event, authorizing an application, using an application, interacting with an advertisement, and engaging in a transaction.

The interface generator 220 generates one or more interfaces, such as web pages, including content from the social networking system 140. For example, interfaces generated by the interface generator 220 include images, video, profile information, or other data. The interface generator 220 also generates one or more interfaces allowing the social networking system 140 to request information from users and for users to provide information to the social networking system 140 via a client device 110 and the network 120. For example, the interface generator 220 generates a form for a user to provide biographic information, such as the user's age, for inclusion in the user's user profile. When other users request a user's profile page, the interface generator 220 retrieves data from the profile store 205 and generates a representation of the information in the user profile for presentation by a client device 110.

The interface generator 220 also generates an interface for displaying prompts associated with actions identified based on a trigger event (a "prompt interface"). In various embodiments, the prompt interface is displayed in a variety of ways. For example, the prompt interface is displayed in a composer interface when a user checks-in to a location associated with an object or is displayed in a pop-up window in conjunction with a story about the check-in presented in a user's timeline. The prompt interface allows users to take an action associated with a check-in or association between an object and content. For example, the prompt interface displays an offer for a user to claim a free meal voucher at a hotel at which the user has checked in or displays stories describing other users that expressed a preference for a brand page associated with the hotel. In one embodiment, the prompt interface allows a user to scroll between multiple prompts associated with a single check-in or association between an object and content (e.g., accessing a scroll bar). The prompt interface is further described below in conjunction with FIGS. 3 and 4.

The edge store 225 includes information describing connections between users and other objects in the social networking system 140 as edges. Some edges may be defined by users, allowing users to specify their relationships with other users. For example, users may generate edges with other users that parallel the users' real-life relationships, such as friends, co-workers, partners, and so forth. Generally, establishing a connection to a user in a social networking system 140 allows access to more information about the user to which the connection was established than would be available to unconnected users. For example, users connected to each other may receive informational updates about each other, including actions performed by each user on the social networking system 140, via stories presented on newsfeeds. Other edges are generated when users interact with objects in the social networking system 140, such as expressing interest in a page on the social networking system 140, sharing a link with other users of the social networking system 140, or commenting on posts made by other users of the social networking system 140. These edges may be visible to other social networking system users. Multiple interactions between a user and an object may be stored in a single edge in the edge store 225 or may each be stored as a separate edge. In some embodiments, connections between users may be stored in the user profile store 205, or the user profile store 205 may access the edge store 225 to determine connections between users.

The object store 230 stores information about content maintained by the social networking system 140. Different content "items," each representing individual pieces of content provided by the social networking system 140 to users, are stored as objects in the object store 230. Examples of objects include applications (e.g., a game playable within the social networking system 140), events (e.g., a concert that users may attend), groups, pages, products or services (e.g., clothing, electronics, cleaning services, or beauty services)

media items (e.g., pictures, videos, audio, text, or any other type of media content), locations associated with a user (e.g., "Santa Clara, Calif., USA"), concepts or other terms (e.g., "Victorian literature"), or other suitable data presented to users. The object store 230 may also store objects representing other data generated by social networking system users, such as messages, status updates, photos, videos, comments, notes, and postings. An object in the object store 230 may represent an entity existing within the social networking system 140 (e.g., an application available on the social networking system 140), an entity existing outside the domain of the social networking system 140 (e.g., a website), or a real-world entity (e.g., a sports team or a retail store).

The object store 230 may store data for generating content presented to social networking system users, such as code of an application or image data associated with image media. Alternatively, for objects representing entities outside of the social networking system 140, the object store 230 includes a pointer or a reference to a destination associated with an entity, such as the uniform resource locator (URL) of an external media item. Additionally, the object store 230 may store metadata associated with objects, such as a name describing the object (e.g. "Charles Williams" for a page for a person, "Birthday Reminder" for an application, or "Penguin Fanciers" for a group), an image representing the object (e.g., a user profile picture), or one or more tags assigned to the object by users (e.g. the textual strings "game," "crime," and "strategy" for a strategy game application). Different types of objects may have different types of metadata, such as a set of associated users for a group, a media type (e.g., "video") for a media item object, and a unique user identifier or name tokens (e.g., separate first and last names "Charles" and "Williams") for a an object representing a person.

The context analyzer 235 analyzes the context associated with content provided to the social networking system 140 from a user, as well as the user's user profile and stored actions to identify actions of actions to present when a user checks-in to a location associated with an object or associates the object with content. In one embodiment, the context analyzer 235 determines actions relevant to an object associated with a location based on text data included in the content provided to the social networking system along with a check-in or association with an object. Analyzing received text data allows the context analyzer 235 to discern relevant subject matter (e.g., whether the word "Fiji" tagged in a user's post refers to a location or a brand of bottled later) and user sentiment, as well as any other suitable information. The context analyzer 235 may also retrieve information from the user profile store 205, action store 215, edge store 225, and/or object store 230 to identify actions relevant to a user performing a check-in or associating an object with content and to select an action for presentation to the user. Context analysis may be performed using one or more machine-learning processes or any other suitable process for determining a user's intent, sentiment, or affinity.

The web server 240 communicates data between the social networking system 140 and one or more client devices 110, as well as one or more third party websites 130, via the network 120. The web server 240 serves web pages, as well as other content, such as JAVA®, FLASH®, XML and so forth. In one embodiment, the web server 240 receives and routes messages between the social networking system 140 and the client device 110, for example, instant messages, queued messages (e.g., email), text and short message service (SMS) messages, or messages sent using any other suitable messaging technique. A user may send a request to the web server 240 to upload information, for example, images or videos that are stored in the object store 230. Additionally, the web server 240 may provide application programming interface (API) functionality to send data directly to native client device operating systems, such as IOS®, ANDROID™, WEBOS® or RIM®.

Selection and Presentation of Actions

Figure 3:
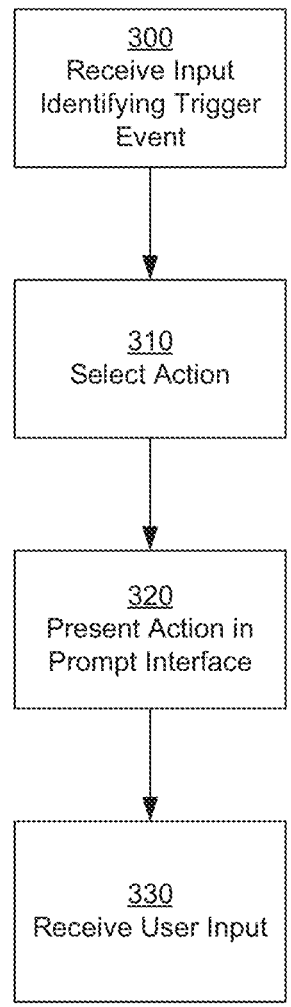
FIG. 3 is flow chart of a method for prompting a user to take an action associated with a check-in or association with an object maintained by a social networking system, in accordance with an embodiment of the invention.

FIG. 3 is a flow chart of one embodiment of a method for prompting a user to take an action associated with a check-in to a location associated with an object or associating an object with content. When the social networking system 140 receives 300 an input from a user identifying a trigger event 300, the interface generator 220 generates a prompt interface. Trigger events include checking-in to a location associated with an object or associating posted content with an object or with a location associated with the object. In other embodiments, a trigger event is a user associating an object (e.g., a page, an application, etc.) with content or performing an action associated an objects maintained by the social networking system 140 (e.g., likes a page, installs an application, etc.). For example, a trigger event is receiving content including a tag associated with a location corresponding to an object maintained by the social networking system 140 or including a tag associated with an object maintained by the social networking system 140.

Based on the received trigger event, the social networking system 140 selects 310 an action object or location included in the trigger event for presenting to the user via the prompt interface. Examples of actions presented via the prompt interface include allowing a user to claim an offer, interacting with an advertisement or story, installing an application, expressing a preference for a page or other object, providing additional information about an object or location included in the trigger event. Presenting an offer in response to a user check-in and presenting an advertisement in response to a user check-in are further described in U.S. patent application Ser. No. 13/564,583, filed on Aug. 1, 2012, and U.S. patent application Ser. No. 12/977,027, filed on Dec. 22, 2010, respectively, which are each hereby incorporated by reference in their entirety.

Based on the location or object and contextual information associated with the trigger event, the context analyzer 235 selects 310 an action for presentation to the user. For example, one or more actions associated with a tag included in the context identifying a location are selected 310. The context analyzer 235 selects 310 actions based on the type of location or object associated with content using information retrieved from the object store 230 (e.g., if the location is a retail store, an action may include allowing the user to interact with an advertisement for a product sold at the retail store). The context analyzer 235 may also analyze text information in content associated with the trigger event or with content associated with the trigger event when selecting 310 actions. For example, if a user-checks in to a location associated with a movie theater and includes in a post that the user saw a movie at the location, a prompt for more specific information may ask the user to provide the name of the movie.

In one embodiment, if an object associated with content may have different types (e.g., "Fiji" may be interpreted as a place or a brand of bottled water) the context analyzer 235 analyzes the context in which the object is associated with content appears to select 310 actions. Additionally, the context analyzer 235 may discern a user's emotions or opinions form received content to aid in selecting 310 an action. For example, the context analyzer 235 may determine that content including "That movie was hilarious!" indicates the movie caused the user to have a good mood. Based on this determination, the context analyzer 235 selects 310 an action that presents the user with an advertisement for gag gifts.

The context analyzer 235 may analyze a user's user profile and previously performed actions when selecting 310 actions for presentation by via the prompt interface. For example, information in a user profile and/or stored actions associated with the user is analyzed to determine characteristics of the user. In one embodiment, the context analyzer 235 identifies one or more applications associated with a location or object associated with a location based on information in a user profile and/or stored actions associated with the user. Other information from the user profile store 205, the action store 215, and the edge store 225 may be retrieved to determine characteristics of the user. For example, if a user checks-in at a location associated with a sushi restaurant, relevant actions include viewing information about another sushi restaurant associated with a previous check-in by the user, such as a length of time since the previous check-in or offers provided by the current restaurant. Machine-learned processes or any other suitable process may be used to analyze contextual information.

The action selected 310 by the context analyzer 235 is presented 320 as a prompt in the prompt interface, which may be presented in a variety of ways to the user from which the trigger input was received 300. Examples of presentation of the prompt interface are described above. For example, the prompt interface may be integrated into and displayed with a composer interface, a newsfeed, or a timeline. For example, the prompt interface may be displayed to the user in a newsfeed in conjunction with a story describing the trigger event or displayed in a timeline associated with the user in conjunction with a story describing the trigger event. In one embodiment, the prompt interface prompts the user to install one or more of the identified applications associated with the location or object associated with the location. The appearance of the prompt including the selected action may vary based on the type of client device 110 used to access the social networking system 140 (e.g., whether a mobile version or a full version of the social networking system 140 is displayed). In one embodiment, the prompt is also displayed 320 to users other than the user performing the trigger event. For example, the prompt is displayed 320 in the newsfeed of other users identified in content associated with the trigger event, or other users connected to the user who performed the trigger event. If the prompt is displayed to other users, the action in the prompt may be differently selected based on user-specific characteristics, similar to the selection described above.

Figure 4:
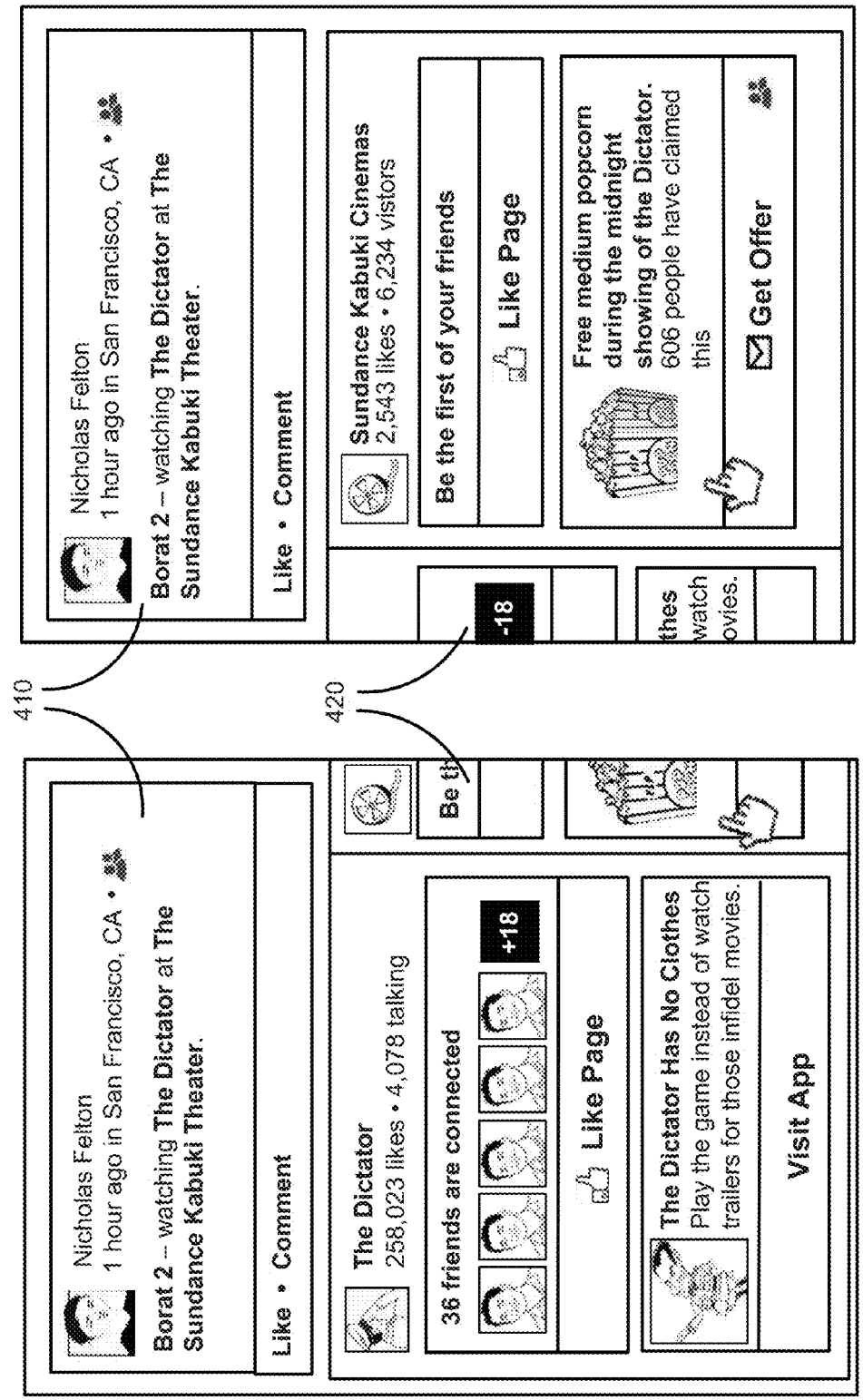
FIG. 4 is an example user interface including actions associated with a check-in to a location associated with an object, in accordance with an embodiment of the invention.

Multiple actions may be presented in a prompt interface if the context analyzer 235 determines that more than one action is relevant to a particular location, object, user, and/or context. FIG. 4 shows an example of a prompt interface including more than one action. In the example of FIG. 4, a user checks-in at a location associated movie theater and identifies a movie name in content associated with the check-in. A story 410 describing the check-in and associated content is presented and the prompt interface 420 includes various actions, such as liking a page about the movie, visiting an application for a game based on the movie, liking a page for the theater, and claiming an offer for the theater. To allow viewing of multiple actions associated with a single object or location associated with an object, the prompt interface 420 allows the user to navigate between multiple actions (e.g., by accessing a scroll bar). In one embodiment, multiple actions are ranked in a display queue and displayed in the prompt interface 420 in an order based on the display queue. For example, the prompt interface 420 may display prompts to install applications in an order based on the likelihood of the user installing the identified application, which may be calculated based on user profile information associated with the user, actions performed by the user on the social networking system 140, actions performed by the user on one or more third party websites 130, information associated with one or more users of the social networking system 140 connected to the user, and/or a geographic location associated with the user. In another embodiment, a specified number actions, such as the highest ranked actions or actions having at least a threshold ranking are displayed. Actions may be ranked based in part on their relevance to the user (i.e., how likely the user is to take the action prompted).

The social networking system 140 may direct the user to a destination associated with the action presented by the prompt interface 320 when an input accessing the presented action is received 330. For example, if the selected action prompts the user to claim an offer or interact with an advertisement, the user may be directed to a page or third party website 130 allowing the user to claim the offer, print a coupon, purchase a product or service, or perform another suitable action when an input selecting an action is received 330. If the selected action prompts the user to interact with a story, an application, or a page, the user may be directed to a destination for retrieving information about the story, installing the application, expressing a preference for the page, creating a post for the page, or performing another action when an input selecting an action is received 330. Additionally, if the selected action allows the user to receive additional information about the location or object, the user may be directed to a destination for retrieving the information. In one embodiment, if the selected action prompts the user to provide additional information about the object or location associated with the trigger event, information provided by the user may be included in content associated with the trigger event and may be used to select additional actions.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving an input including a content item for posting to a social networking system from a user of the social networking system;
   determining that the input includes a first tag that identifies a location maintained by the social networking system and a second tag that identifies a different user of the social networking system, the location being associated with the content item;
   executing a context analysis based on the input including the identified location identified by the first tag and user profile information associated with the user, wherein the user profile information includes previously performed actions of a user, and wherein the previously performed actions are recorded and stored in an action store;
   identifying one or more applications associated with the location identified based in part on the context analysis, wherein the identified one or more applications are selected from objects contained in an object store maintained by the social networking system;
   ordering the one or more applications into a presentation queue based at least in part on a likelihood that the user will install each of the one or more applications; and
   generating a first user interface prompting the user to install one or more of the identified applications and a second user interface, based in part on the second tag, that prompts the different user to install one or more of the identified applications based on the location from the first tag, the first user interface including the presentation queue.

2. The method of claim 1, wherein the input comprises content uploaded to the social networking system.

3. The method of claim 1, wherein the likelihood that the user will install an application from the one or more applications is based at least in part on information selected from a group consisting of: user profile information associated with the user, actions performed by the user on the social networking system, actions performed by the user on one or more third party websites, information associated with one or more users of the social networking system connected to the user, a geographic location associated with the user, and any combination thereof.

4. The method of claim 1, further comprising:
   presenting the user interface to one or more additional users of the social networking system connected to the user.

5. The method of claim 1, wherein identifying one or more applications associated with the location identified is based at least in part on information selected from a group consisting of: user profile information associated with the user, actions performed by the user on the social networking system, actions performed by the user on one or more third party websites, information associated with one or more users of the social networking system connected to the user, a geographic location associated with the user, information included in the input, and any combination thereof.

6. A method comprising:
   maintaining a plurality of objects associated with locations in a social networking system;
   receiving an input from a user of the social networking system, the input comprising content for presentation to additional users of the social networking system;
   determining that the input includes a first tag that identifies a location associated with an object stored by the social networking system, and a second tag that identifies a different user of the social networking system, the location being associated with the content for presentation;
   executing a context analysis based on the input including the identified location identified by the first tag and user profile information associated with the user, generating a user interface prompting the user to provide additional information describing the location, wherein the user profile information includes previously performed actions of a user, wherein the previously performed actions are recorded and stored in an action store;
   receiving additional information describing the location from the user;
   associating the received additional information with the location;
   identifying, by the social networking system, one or more applications associated with the location based in part on the context analysis, the received input and the received additional information, wherein the identified one or more applications are selected from objects contained in an object store maintained by the social networking system;
   ordering the one or more applications into a presentation queue based at least in part on a likelihood that the user will install each of the one or more applications; and
   generating a first user interface prompting the user to install one or more of the identified applications and a second user interface, based in part on the second tag, that prompts the different user to install one or more of the identified applications, the first user interface including the presentation queue.

7. The method of claim 6, further comprising:
   presenting the user interface to the user.

8. The method of claim 6, wherein the plurality of objects in a social networking system are selected from a group consisting of: a page, an application, an event, a user, and any combination thereof.

9. The method of claim 6, wherein the likelihood that the user will install an action from the one or more identified applications is based at least in part on information selected from a group consisting of: user profile information associated with the user, actions performed by the user on the social networking system, actions performed by the user on one or more third party websites, information associated with one or more users of the social networking system connected to the user, a geographic location associated with the user, and any combination thereof.

10. The method of claim 6, further comprising:
presenting the second user interface to the different user.

11. The method of claim 6, further comprising:
presenting the first user interface for display to the user.

12. The method of claim 6, wherein identifying, by the social networking system, one or more applications associated with the location is also based at least in part on information selected from a group consisting of: user profile information associated with the user, actions performed by the user on the social networking system, actions performed by the user on one or more third party websites, information associated with one or more users of the social networking system connected to the user, a geographic location associated with the user, information included in the input, and any combination thereof.

13. A method comprising:
receiving an input including a content item from a user of a social networking system;
determining that the input includes a first tag that identifies a location maintained by the social networking system and a second tag that identifies a different user of the social networking system, the location being associated with the content item;
executing a context analysis based on the input including the identified location identified by the first tag and user profile information associated with the user, wherein the user profile information includes previously performed actions of a user, and wherein the previously performed actions are recorded and stored in an action store;
identifying, by the social networking system, one or more applications associated with the location identified based in part on the context analysis, wherein the identified one or more applications are selected from objects contained in an object store maintained by the social networking system;
identifying the different user connected to the user through the social networking system and identified by the second tag;
ordering the one or more applications into a presentation queue based at least in part on a likelihood that the different user will install each of the one or more applications; and
presenting a user interface prompting the different user to install one or more of the identified applications, the first user interface including the presentation queue.

* * * * *